Aug. 10, 1926.
R. C. PIERCE
1,595,313
PNEUMATIC TIRE CONSTRUCTION
Filed March 30, 1923
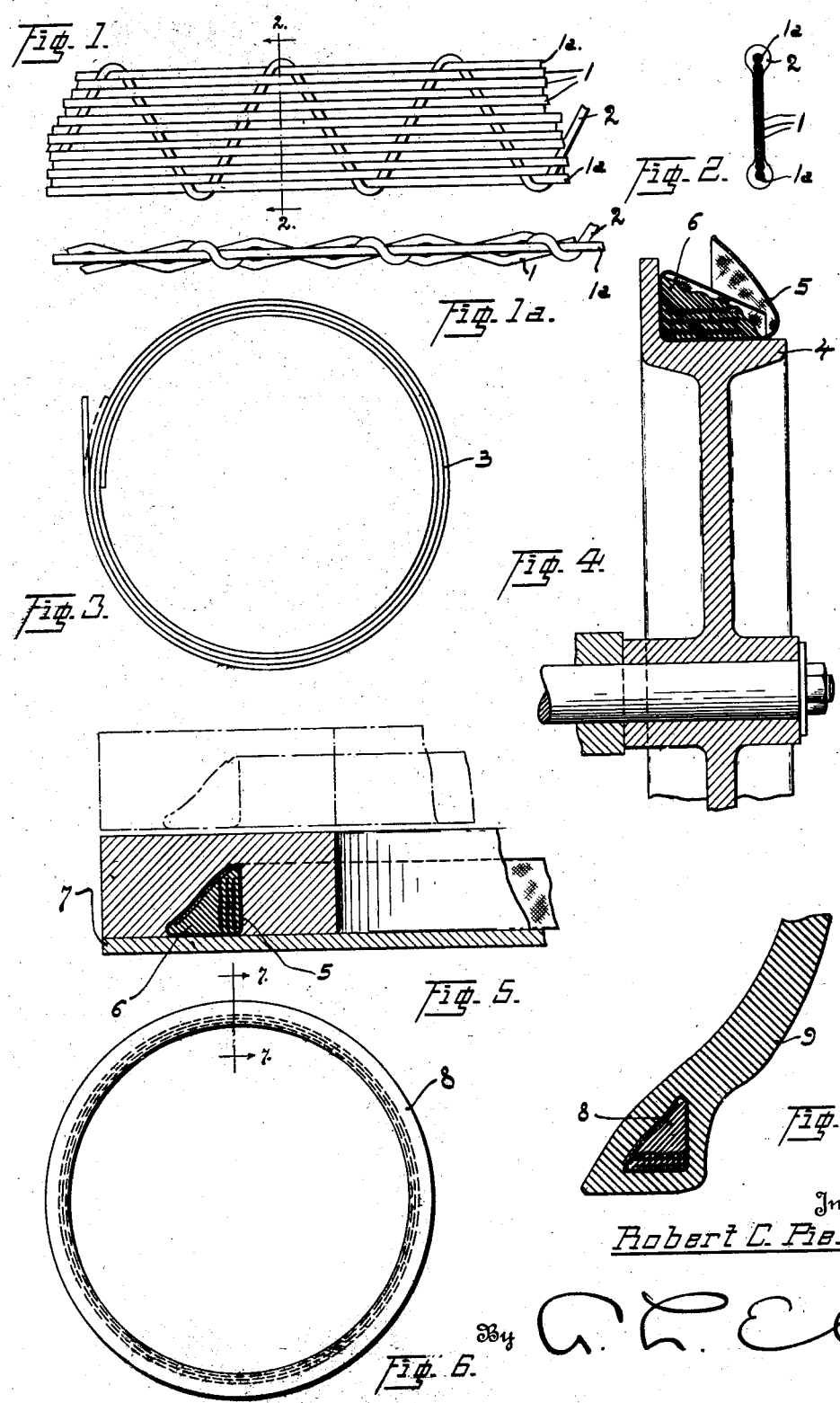
Inventor
Robert C. Pierce.
By
Attorney Patented Aug. 10, 1926.

1,595,313

UNITED STATES PATENT OFFICE.

ROBERT C. PIERCE, OF BELLEVILLE, NEW JERSEY, ASSIGNOR TO JOHN R. GAMMETER, OF AKRON, OHIO.

PNEUMATIC-TIRE CONSTRUCTION.

Application filed March 30, 1923. Serial No. 628,688.

This invention relates to the construction of pneumatic automobile tires of the straight side or inextensible bead type, it being one of the objects of the invention to improve upon the bead structure and particularly the reinforcement contained in the bead and designed to impart inextensibility to it.

It will be appreciated by those familiar with the art that beads of the type described should be reinforced by an inextensible medium which should be somewhat flexible and should be capable of uniting with the rubber composition which forms the body or major portion of the bead. Beads of this type are usually triangular in cross-section, or substantially so, and are provided with a mass of circumferentially extending wires which are embedded within, and vulcanized to, the rubber of the bead. Heretofore the general practice has been to make use of a tape which is composed of a plurality of wires extending back and forth across the tape and braided together so that the meshes are in the general form of elongated diamonds with their long axes in the direction of the circumference of the bead.

Braided tape of the type described has been used for a considerable period in the form of a straight-side tire where the triangular bead is employed, but it has had disadvantages, especially as it requires expensive and complicated machinery to manufacture it and as it has a certain stretchability due to the diamond-shaped formation of the weave.

In my prior application, Serial No. 530,801, filed January 21, 1922, I have shown and described a form of tape which obviates all of the disadvantages attendant upon the use of the prior diamond-shaped mesh or braided wire. The present invention is based upon the said prior disclosure, but aims to add thereto certain advantages as will be apparent.

The present invention has for its object the provision of a larger number of wires in a width of tape than that shown in the prior application, whereby greater tensile strength may be imparted to the bead structure. It is also an object of this invention to place the longitudinal wires closer together than as shown in the prior application in order to prevent possible displacement of the wires under lateral pressure such as may be exerted in the bead-curing or tire-curing mold.

In the drawing is shown one embodiment of this improvement invention in which

Figure 1 is a view of a portion of the wire forming the subject matter of the invention;

Fig. 1ª is a side elevation thereof;

Fig. 2 is a cross-section on the line 2—2 of Fig. 1;

Fig. 3 is a side elevation of the wire as coiled or wrapped into the plurality of layers in which it is received in the tire;

Fig. 4 is a view showing the manner in which the elements of the bead are assembled;

Fig. 5 is a view showing the bead in the curing mold;

Fig. 6 is a side elevation of the completed bead; and

Fig. 7 is a cross-section through one bead portion of a pneumatic tire casing showing the improved bead in position.

The wire reinforcement is shown in Figs. 1, 1ª, 2, and 3. It will be seen that it contains a large number of parallel or circumferential warp wires 1 which are held together in the form of a tape by a crossing wire 2. The outer circumferential or selvage wires 1ª may be of greater tensile strength than the inner or filling wires, although this is not essential. It will be noted that the wires are placed closely together across the tape, in fact the object of the present invention is to completely fill the tape from edge to edge with longitudinal wires which are placed in substantial contact with one another, or the wires may be said to have "zero spacing."

The crossing wire 2 is woven back and forth across the longitudinal or warp wires under tension in the zigzag position shown in Fig. 1, and while it is of higher gage than the warp wires it passes in substantially straight lines from edge to edge of the tape whereby a considerable wave or undulation is imparted to each surface of the tape as shown in Fig. 1ª. These waves in the warp wire serve to give a large anchorage to the rubber which is to be applied around the reinforcement. If the outer wires are stiffer than the inner or filling wires the outer wires will be straight as shown in Fig. 1ª. If the parallel wires are of equal strength throughout, all of the wires will assume an undulatory character.

The subsequent steps in the manufacture of the bead are shown in Figs. 4, 5 and 6.

The hoop or ring of wire tape 3 (shown in Fig. 3) which may or may not be "insulated," or coated with rubber, is formed or placed on a form or wheel 4 and over a strip of fabric 5 which is designed to form the cover of the bead. A mass of rubber 6 is placed on or about the bead ring and the cover is folded over as shown in Fig. 4. The soft, unvulcanized bead is now placed in a mold and given a partial cure which brings it to substantially rigid condition and imparts the triangular cross-section thereto. The mold is shown at 7 and the partially vulcanized bead is shown at 8 in Figs. 5 and 6.

The bead is now ready to be placed in a tire. A portion of the tire with the improved bead incorporated therein is shown at 9 in Fig. 7.

It will be observed by an inspection of the drawing and from the description of the invention that the wire tape or bead reinforcement comprises the largest number of wires which it is possible to place in the width of tape. They are in contact through that portion of the tape where the crossing wire does not intervene. The crossing wire holds the warp wires in their proper position and also places waves or even undulations on the upper and lower surfaces of the tape which assist materially in affording a grip or foundation for the rubber, thereby increasing the tenacity with which the rubber and the wire reinforcement are bound together. As the wires are in contact across the tape, it is impossible to easily crush the tape by lateral pressure.

In carrying out the objects of the present invention it is not essential that all of the details recited herein be retained, it being possible to embody the invention in different forms and with modifications and variations, as will be understood by those familiar with the art.

What I claim is:

1. In a tire construction, a bead, said bead embodying a reinforcement adapted to impart inextensibility thereto, said reinforcement comprising a plurality of parallel warp wires in contact with one another and a filler wire woven back and forth across the warp wires and serving to maintain them in position.

2. In a tire construction, a bead, said bead embodying a reinforcement adapted to impart inextensibility thereto, said reinforcement comprising a plurality of parallel warp wires in contact with one another, a filler wire woven back and forth across the warp wire woven back and forth across the warp wires and serving to maintain them in the form of a flat tape, and a filling of rubber composition surrounding and vulcanized to the tape.

3. In a tire construction, a bead, said bead embodying a reinforcement in the form of a wire tape adapted to impart inextensibility to the bead, said tape comprising a plurality of warp wires in contact with one another and a continuous filler wire in zigzag diagonal courses tying the warp wires together.

4. In a tire construction, a bead, said bead embodying a reinforcement in the form of a wire tape adapted to impart inextensibility to the bead, said tape comprising a plurality of warp wires in contact with one another and a continuous filler wire in zigzag diagonal courses tying the warp wires together and forming the surfaces of the tape in undulations or waves.

5. A tire bead comprising a ring-shaped body substantially triangular in cross-section and composed of a rubber composition and a reinforcement for said bead parallel to one side thereof and comprising a wire tape wrapped in a plurality of convolutions, the wire tape being formed from a plurality of parallel warp wires placed in contact with one another and a continuous crossing wire interwoven with said warp wires and serving to maintain them in parallel relationship.

6. A tire bead comprising a ring-shaped body substantially triangular in cross-section and composed of a vulcanized rubber composition and a reinforcement for said bead, said reinforcement comprising a wire tape formed from a plurality of parallel warp wires in contact with one another and a crossing wire interwoven with said warp wires.

ROBERT C. PIERCE.